US012769157B1

(12) United States Patent
Chen et al.

(10) Patent No.: US 12,769,157 B1
(45) Date of Patent: Oct. 20, 2026

(54) ELECTRO-OPTIC MODULATOR AND LIGHT EMITTING DEVICE

(71) Applicant: SILITH TECHNOLOGY PTE. LTD., Singapore (SG)

(72) Inventors: Yuxuan Chen, Singapore (SG); Yunchu Yu, Singapore (SG); Ke Zhang, Singapore (SG)

(73) Assignee: SILITH TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 19/643,838

(22) Filed: Apr. 10, 2026

(51) Int. Cl.
*G02F 1/035* (2006.01)

(52) U.S. Cl.
CPC .................................... *G02F 1/035* (2013.01)

(58) Field of Classification Search
CPC .................................. G02F 1/035; G02B 6/28
See application file for complete search history.

(56) References Cited

U.S. PATENT DOCUMENTS 8,824,836 B2 * 9/2014 Sugiyama ............. G02F 1/3137 385/32
9,544,668 B2 * 1/2017 Piehler ................... G02B 6/125
11,009,659 B2 * 5/2021 Ward ..................... G02F 1/2255

* cited by examiner

*Primary Examiner* — Jennifer Doan
(74) *Attorney, Agent, or Firm* — JCIPRNET

(57) ABSTRACT

Electro-optic modulator and light emitting device, including: optical waveguide structure including first adjusting arm and second adjusting arm, each adjusting arm is divided into at least two optical waveguide segments, each segment has electro-optic phase shifter arranged on, at least one optical delay unit is arranged on at least one optical waveguide segment, having same amount and position on different adjusting arms; both ends of each adjusting arm are connected to beam splitter and beam combiner respectively, optical waveguide crossing unit is arranged between adjacent optical waveguide segments, where first optical signal in first adjusting arm and second optical signal in second adjusting arm are exchanged; electrode structure including first electrode line and second electrode line, each electro-optic phase shifter on first or second adjusting arm electrically connected to first or second electrode line respectively. Expand bandwidth of modulator and support higher communication rate.

10 Claims, 5 Drawing Sheets

ELECTRO-OPTIC MODULATOR AND LIGHT EMITTING DEVICE

BACKGROUND

Technical Field

The present application relates to the technical field of optical communication, and more specifically, to a high-speed electro-optical modulator and a light emitting device.

Description of Related Art

An optical modulator is acting as a key core device in an optical communication system, the performance thereof can determine directly a transmission rate, a bandwidth, and a signal quality of an entire communication system. A Mach-Zehnder modulator (MZM) has a plurality of significant advantages including a high linearity, a fast modulation rate, a large operating bandwidth, and more, thus having been widely applied in the field of high-speed optical communication. The MZM splits an input optical signal into two paths, and applies an electrical modulation signal onto each transmission path of the two paths of optical signals respectively, such that the two paths of optical signals generate a phase difference, followed by performing interference superposition on the two paths of optical signals by a combiner, thereby implementing intensity modulation to the optical signals.

However, in an actual application process, a conventional MZM modulator has gradually exposed a plurality of technical bottlenecks hard to overcome, restricting a further application thereof in an optical communication system requiring a higher speed and a better performance. On one hand, with a modulation rate continuing to be increased, a problem of bandwidth limitation of a conventional MZM modulator is prominent day by day. Due to an influence of a plurality of factors including an electrode structure design, a parasitic parameter and more, the conventional MZM modulator has a severe signal attenuation and phase distortion occur during a signal transmission process at a high-frequency band, resulting in a modulation bandwidth hard to meet a requirement of an ultra-high-speed communication, also a signal integrity is greatly challenged.

Therefore, a high-speed electro-optical modulator having a large bandwidth is required.

SUMMARY

The technical problem to be solved by the present application is providing a high-speed electro-optical modulator and a light emitting device, being able to expand the bandwidth of the modulator and support a higher communication rate.

In order to achieve the technical purpose stated above, a first aspect of the present application provides an electro-optic modulator, comprising:

an optical waveguide structure including a beam splitter, a first adjusting arm, a second adjusting arm, an optical waveguide crossing unit, an optical delay unit, and a beam combiner, wherein each of the first adjusting arm and the second adjusting arm includes at least two optical waveguide segments along an optical signal transmission direction, each of the optical waveguide segments has an electro-optical phase shifter arranged, at least one optical waveguide segment of the first adjusting arm has an optical delay unit arranged, and at least one optical waveguide segment of the second adjusting arm has an optical delay unit arranged, while an amount of the optical delay units on each adjusting arm is same and a position thereof on each adjusting arm is same along the optical signal transmission direction; the first adjusting arm and the second adjusting arm are arranged in parallel, while both ends of each adjusting arm are connected to the beam splitter and the beam combiner respectively; the optical waveguide crossing unit is arranged between adjacent optical waveguide segments of the first adjusting arm and the second adjusting arm, such that a first optical signal in the first adjusting arm and a second optical signal in the second adjusting arm are exchanged at the optical waveguide crossing unit;

an electrode structure including a first electrode line and a second electrode line arranged in parallel, wherein the optical waveguide structure is arranged between the first electrode line and the second electrode line, each electro-optical phase shifter on the first adjusting arm is electrically connected to the first electrode line, and each electro-optical phase shifter on the second adjusting arm is electrically connected to the second electrode line.

In an embodiment, one of the optical waveguide segments in the first adjusting arm and the second adjusting arm, has at least two optical delay units arranged.

In an embodiment, two of the optical delay units on a same optical waveguide segment have two different structures.

In an embodiment, the optical delay unit is an optical delay line, a slow wave structure, or a sub-wavelength grating.

In an embodiment, each of the adjusting arms has the electro-optic phase shifter and the optical delay unit arranged in pairs, and in each pair, the optical delay unit is located behind the electro-optic phase shifter.

In an embodiment, the optical waveguide crossing unit includes a first optical waveguide crossing unit and a second optical waveguide crossing unit connected in series, while the first optical waveguide crossing unit and the second optical waveguide crossing unit are located between adjacent optical waveguide segments.

In an embodiment, a light path connecting the first optical waveguide crossing unit in series and a parallel light path connecting the second optical waveguide crossing unit in series both have the optical delay unit arranged.

In an embodiment, each of the beam splitter and the beam combiner is one of a directional coupler, a multimode interferometer, and a Y-coupler, respectively.

In an embodiment, the electro-optic modulator is integrated on a silicon-on-insulator material platform, a thin-film lithium niobate material platform, a groups III-V material platform, a barium titanate material platform, a thin film lithium tantalate material platform, or a lead zirconate titanate material platform.

A second aspect of an embodiment of the present application provides a light emitting device, comprising: a housing, a driving circuit, and the electro-optic modulator according to any one of the electro-optic modulator stated hereinabove; the electro-optic modulator and the driving circuit are arranged inside the housing, and both the first electrode line and the second electrode line are connected to the driving circuit.

Compared with the prior art, the present application has following beneficial effects: by dividing each adjusting arm into at least two optical waveguide segments, and arranging the electro-optic phase shifter on each segment, while the first adjusting arm is electrically connected to the first electrode line by each electro-optical phase shifter arranged thereon, and the second adjusting arm is electrically connected to the second electrode line by each electro-optical phase shifter arranged thereon, the present application has the electrode structure being simple and easy to manufacture, further it is possible to build the two electrode lines distributed in parallel by a metal material. And by arranging the optical delay unit and the optical waveguide crossing unit in an optical waveguide structure, it is possible to achieve an optical delay for an optical signal in each adjusting arm by the optical delay unit, and exchange the first optical signal in the first adjusting arm and the second optical signal in the second adjusting arm by the optical waveguide crossing unit, so as to combine a length of each electro-optic phase shifter, achieve a high-speed transmission for different signals having different frequencies, and achieve a large bandwidth modulation.

BRIEF DESCRIPTION OF THE DRAWINGS

In order to illustrate the technical solutions in the embodiments of the present application more clearly, the following briefly describes the accompanying drawings required for describing the embodiments or the prior art. Apparently, the accompanying drawings in the following description are merely some embodiments of this application. For those of ordinary skills in the art, more drawings may be obtained based on these accompanying drawings without creative efforts.

DESCRIPTION OF THE EMBODIMENTS

Unless otherwise defined, technical terms or scientific terms used in the present specification and claims shall have the ordinary meaning as understood by one of ordinary skill in the art to which the present application belongs. The detailed description of the present application will be described below with reference to the accompanying drawings. It should be noted that, in the specific description of these embodiments, in order to describe the brief description, all features of an actual implementation may not be described in detail in the present description. A person skilled in the art can modify and substitute the embodiments of the present application without departing from the spirit and scope of the present application, and the obtained embodiments are also within the protection scope of the present application.

A conventional MZM modulator, in order to solve a problem of bandwidth limitation, generally adopts a method of reducing a length of the modulator. A principle thereof lies in that, during a transmission process of a radio frequency signal propagating along an electrode, a high-frequency component generates greater transmission loss compared to a low-frequency component. Since a phase difference generated by a modulator is related to a product of an applied voltage and an effective action length thereof, in a front segment of a modulation region, both a high-frequency signal and a low-frequency signal can be effectively propagated and contribute a phase modulation; but in a rear segment of the modulation region, the high-frequency signal is significantly attenuated due to a loss, and almost not able to participate in a modulation, while a low-frequency signal can still continue to propagate and accumulate a phase difference. Therefore, in a modulator having a long length, the phase difference accumulated by the low-frequency signal will be significantly greater than that accumulated by the high-frequency signal, resulting in a limited overall modulation bandwidth. By shortening a length of the modulation region, it is able to reduce an excessive accumulation of the phase difference by the low-frequency signal in the rear segment of the modulation region effectively, thereby improving a high-frequency response and expanding a bandwidth. However, such a modulation manner will reduce modulation efficiency, and in order to maintain a required modulation performance, a driving voltage must be improved, further causing an overall power consumption to rise significantly, thereby forming a technical contradiction between the modulation bandwidth and the power consumption.

In order to solve the technical problem stated hereinabove, the present application provides an electro-optic modulator, being able to expand a width of a modulator and support a higher communication rate.

Figure 1:
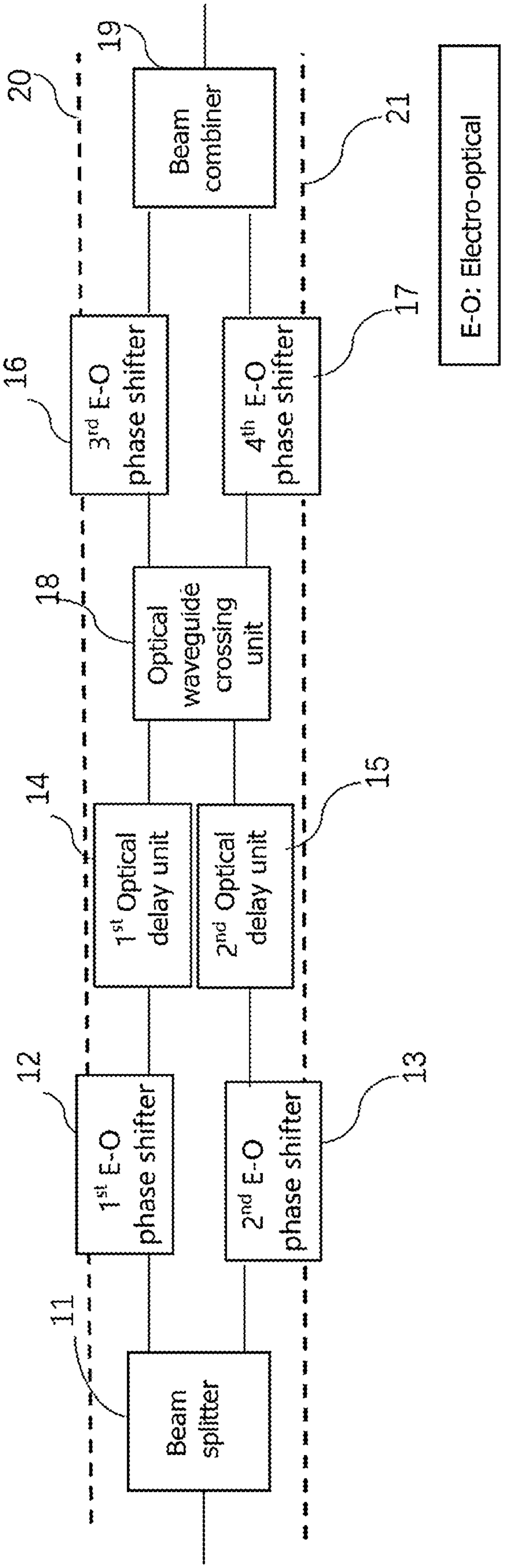
FIG. 1 illustrates a principle block diagram on an electro-optic modulator according to an embodiment of the present application.
Figure 5:
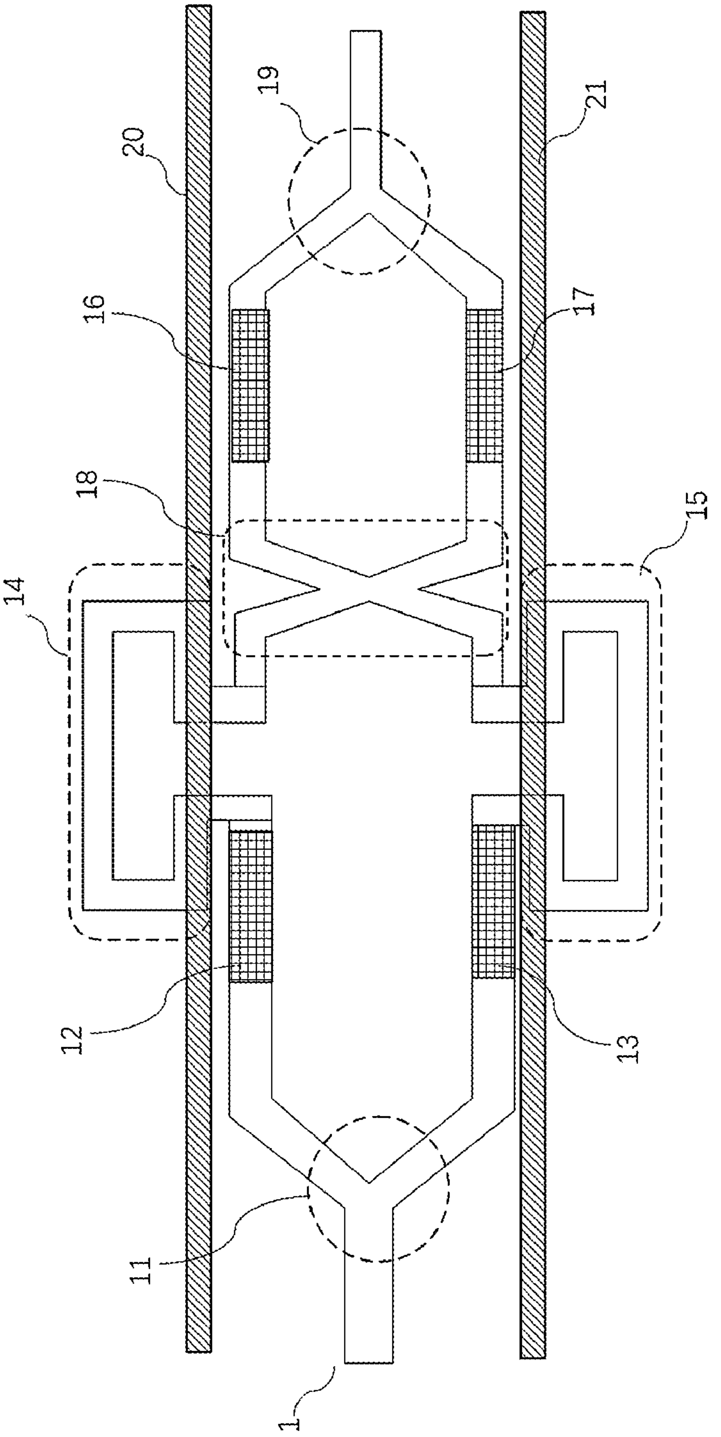
FIG. 5 illustrates a structural schematic diagram on an electro-optic modulator according to an embodiment of the present application.

Referring to FIG. 1 and FIG. 5, in a specific embodiment, the electro-optic modulator comprises:

- an optical waveguide structure 1, including a beam splitter 11, a first adjusting arm, a second adjusting arm, an optical waveguide crossing unit 18, an optical delay unit and a beam combiner 19, wherein the first adjusting arm and the second adjusting arm are arranged in parallel, and both ends of each adjusting arm are connected to the beam splitter 11 and the beam combiner 19 respectively;
- each of the first adjusting arm and the second adjusting arm includes at least two optical waveguide segments along an optical signal transmission direction, each of the optical waveguide segments has an electro-optical phase shifter arranged; in the present embodiment, each adjusting arm is divided into two optical waveguide segments, both a first electro-optical phase shifter 12 and a third electro-optical phase shifter 16 are arranged on the first adjusting arm, while both a second electro-optical phase shifter 13 and a fourth electro-optical phase shifter 17 are arranged on the second adjusting arm; at least one optical waveguide segment of the first adjusting arm has an optical delay unit arranged, and at least one optical waveguide segment of the second adjusting arm has an optical delay unit arranged, while an amount of the optical delay units on each adjusting arm is same and a position thereof on each adjusting arm is also same, along the optical signal transmission direction; in the present embodiment, each of a first optical waveguide segment of the first adjusting arm and a first optical waveguide segment of the second adjusting arm has an optical delay unit located behind the electro-optical phase shifter, which is a first optical delay unit 14 and a second optical delay unit 15, respectively;

the optical waveguide crossing unit 18 is arranged between adjacent optical waveguide segments of the first adjusting arm and the second adjusting arm, such that a first optical signal in the first adjusting arm and a second optical signal in the second adjusting arm will be exchanged at the optical waveguide crossing unit 18;

an electrode structure including a first electrode line 20 and a second electrode line 21 arranged in parallel, an optical waveguide structure 1 is arranged between the first electrode line 20 and the second electrode line 21, each electro-optical phase shifter on the first adjusting arm (that is, the first electro-optical phase shifter 12 and the third electro-optical phase shifter 16) is electrically connected to the first electrode line 20, and each electro-optical phase shifter on the second adjusting arm (that is, the second electro-optical phase shifter 13 and the fourth electro-optical phase shifter 17) is electrically connected to the second electrode line 21.

The present embodiment, during a working process, by adjusting a length of the first electro-optic phase shifter 12, a length of the second electro-optic phase shifter 13, a length of the third electro-optic phase shifter 16, a length of the fourth electro-optic phase shifter 17, together with an optical delay amount of the first optical delay unit 14 and an optical delay amount of the second optical delay unit 15, is able to adjust an bandwidth of the electro-optic modulator, thereby achieving a purpose of expanding the bandwidth. An optical signal is split into two paths by the beam splitter 11 before entering into the first adjusting arm and the second adjusting arm, that is, a first optical signal entering the first adjusting arm and a second optical signal entering the second adjusting arm, wherein the first optical signal is phase-modulated by the first electro-optical phase shifter 12 before entering the first optical delay unit 14, then entering the optical waveguide crossing unit 18 for a conversion before entering the second adjusting arm, and passing through the fourth electro-optical phase shifter 17 to the beam combiner 19; synchronously, the second optical signal is phase-modulated by the second electro-optical phase shifter 16 before entering the second optical delay unit 15, then entering the optical waveguide crossing unit 18 for a conversion before entering the first adjusting arm, and passing through the third electro-optical phase shifter 16 to the beam combiner 19, where both paths of the optical signals having been modulated are combined and output.

Further, each electro-optical phase shifter on the first adjusting arm is electrically connected to the first electrode line 20, and each electro-optical phase shifter on the second adjusting arm is electrically connected to the second electrode line 21, so that an electrode structure is simple and easy to manufacture. The two electrode lines are arranged in parallel, and each electrode line has continuous impedance, avoiding reflection in signal transmission, thereby avoiding a problem of signal integrity. The modulator is manufactured by a metal material instead of limiting to a specific material, which can significantly reduce a manufacturing cost of a device. In the prior art, for example, a modulator being made of a lithium niobate material, requires a plurality of pairs of parallel electrodes, and each adjusting arm is arranged in a pair of the parallel electrodes, while each pair of the parallel electrodes further has a ground electrode arranged, thereby it increases the difficulty of setting an electrode structure and a manufacturing cost. In addition, a technology of the lithium niobate material is not fully mature at present, and still having a plurality of problems including difficult to etch, having a large device size, unable to integrate a photoelectric detector, and having a limited yield.

A working principle of the electro-optic modulator in the present embodiment is:

by connecting the first electrode line 20 and the second electrode line 21 to a driving circuit, the electro-optic modulator is driven by a differential signal generated by the driving circuit, that is, assuming that a common-mode voltage of the differential signal is $V_b$, and a swing amplitude thereof is $\Delta V$, then a voltage of a maximum value of the differential signal is $V_b+\Delta V$, and a voltage of a minimum value is $V_b-\Delta V$. Each electro-optical phase shifter has a refractive index n changing when increasing the voltage, thereby causing a phase change. For a differential signal propagating along an electrode structure (that is, the first electrode line 20 and the second electrode line 21), during a transmission process, a loss of a high-frequency signal is higher than that of a low-frequency signal, while generation of a phase difference depends on a product of the voltage and a signal propagation length. If $V_\pi L$ is adopted to represent a modulation efficiency of the phase shifter, which means: when a voltage is $V_\pi$ and a length is L, a signal has a phase shift being introduced as $\pi$. Then if a voltage of a signal is V, an effective propagation length is $L_e$, then a phase shift $\Delta\varphi$ being induced correspondingly is: $\Delta\varphi=\pi\times V\times L_e/V_\pi L$.

The present embodiment divides each adjusting arm into two optical waveguide segments, supposing the first electro-optical phase shifter 12 and the second electro-optical phase shifter 13 having a length of L, the third electro-optical phase shifter 16 and the fourth electro-optical phase shifter 17 having a length of L', the high-frequency signal having an attenuation coefficient of an, a medium-frequency signal having an attenuation coefficient of $\alpha_m$, and the low-frequency signal having an attenuation coefficient of $\alpha_l$, further the three having a relationship of $\alpha_l<\alpha_m<\alpha_h$ existing. Then the high-frequency signal has an effective propagation distance of $L_h=[1-\exp(-\alpha_h\cdot L)]/\alpha_h$, the medium-frequency signal has an effective propagation distance of $L_m=[1-\exp(-\alpha_m\cdot L)]/\alpha_m$, and the low-frequency signal has an effective propagation distance of $L_l=[1-\exp(-\alpha_l\cdot L)]/\alpha_l$. Shown as FIG. 5, following the optical signal transmission direction, in the first electro-optical phase shifter 12 and the second electro-optical phase shifter 13, both the high-frequency signal and the low-frequency signal can propagate effectively and cause the phase shift; while in the third electro-optical phase shifter 16 and the fourth electro-optical phase shifter 17, the high-frequency signal has almost been depleted, but the medium-frequency signal and the low-frequency signal can still propagate and cause the phase shift, that is, $L_h<L<L_m<L_l$, $L_l\approx L+L'$.

In the present embodiment, during a transmission process of a high-frequency (HF) signal, a phase shift caused at the first electro-optical phase shifter 12 is $\Delta\varphi_{H1}=\pi\cdot(V_b+\Delta V)\cdot L_h/V_\pi L$, a phase shift caused at the second electro-optical phase shifter 13 is $\Delta\varphi_{H2}=\pi\cdot(V_b-\Delta V)\cdot L_h/V_\pi L$, a phase shift caused at the third electro-optical phase shifter 16 is $\Delta\varphi'_{H1}\approx 0$, and a phase shift caused at the fourth electro-optical phase shifter 17 is $\Delta\varphi'_{H2}\approx 0$. During a transmission process of a medium-frequency (MF) signal, a phase shift caused at the first electro-optical phase shifter 12 is $\Delta\varphi_{M1}=\pi\cdot(V_b+\Delta V)\cdot L/V_\pi L$, a phase shift caused at the second electro-optical phase shifter 13 is $\Delta\varphi_{M2}=\pi\cdot(V_b-\Delta V)\cdot L/V_\pi L$, a phase shift caused at the third electro-optical phase shifter 16 is $\Delta\varphi'_{M1}=\pi\cdot(V_b+\Delta V)\cdot(L_m-L)/V_\pi L$, and a phase shift caused at the fourth electro-optical phase shifter 17 is $\Delta\varphi'_{M2}\approx\pi\cdot(V_b-\Delta V)\cdot(L_m-L)/V_\pi L$. During a transmission process of a low-frequency (LF) signal, a phase shift caused at the first electro-optical phase shifter 12 is $\Delta\varphi_{L1}=\pi\cdot(V_b+\Delta V)\cdot L/V_\pi L$, a phase shift caused at the second electro-optical phase shifter 13 is $\Delta\varphi_{L2}=\pi\cdot(V_b-\Delta V)\cdot L/V_\pi L$, a phase shift caused at the third electro-optical phase shifter 16 is $\Delta\varphi'_{L1}=\pi\cdot(V_b+\Delta V)\cdot L'/V_\pi L$ and a phase shift caused at the fourth electro-optical phase shifter 17 is $\Delta\varphi'_{L2}=\pi\cdot(V_b-\Delta V)\cdot L'/V_\pi L$.

Due to the first optical delay unit 14 and the second optical delay unit 15 being present, a propagation of an optical signal lags behind a propagation of an electrical signal, a phase accumulation relationship is $\Delta\varphi=\Delta\theta-\Delta\theta'\exp(j\omega\tau)$, wherein $\Delta\theta$ is a phase shift caused by the first electro-optical phase shifter 12 or the second electro-optical phase shifter 13, $\Delta\theta'$ is a phase shift caused by the third electro-optical phase shifter 16 or the fourth electro-optical phase shifter 17, $\omega$ is a frequency of an electrical signal, and $\tau$ is a time-delay caused by a delay line. For a high-frequency signal, $\Delta\varphi_2\approx 0$, then a phase difference of the high-frequency signal is $\Delta\varphi_H=\Delta\varphi_{H1}+\Delta\varphi'_{H1}-(\Delta\varphi_{H2}+\Delta\varphi'_{H2})=2\pi\cdot\Delta V\cdot L_h/V_\pi L$; for a low-frequency signal, $\omega=0$, then a phase difference of the low-frequency signal is $\Delta\varphi_L=\Delta\varphi_{L1}-\Delta\varphi'_{L1}-(\Delta\varphi_{L2}-\Delta\varphi'_{L2})=2\pi\cdot\Delta V\cdot(L-L')/V_\pi L$; for a medium frequency signal, $\Delta\varphi_M=\Delta\varphi_{M1}-\Delta\varphi'_{M1}-(\Delta\varphi_{M2}-\Delta\varphi'_{M2})=2\pi\cdot\Delta V\cdot[L-(L_m-L)\cdot\exp(j\omega\tau)]/V_\pi L$. An optical delay unit is able to configure a frequency response more flexibly according to a demand, thereby being able to expand a bandwidth greatly.

For a conventional MZM modulator, in two-optical-signal transmission paths, the phase difference of the high-frequency signal is $\Delta\varphi_H=2\pi\cdot\Delta V\cdot L_h/V_\pi L$, and the phase difference of the low-frequency signal is $\Delta\varphi_L=2\pi\cdot\Delta V\cdot L_l/V_\pi L$. Due to $L_h<L_l$, thus $\Delta\varphi_H<\Delta\varphi_L$, and the phase difference of the high-frequency signal $\Delta\varphi_H$ is significantly lower than the phase difference of the low-frequency signal $\Delta\varphi_L$, that is, having a small bandwidth. While in the electro-optic modulator of the present embodiment, the phase difference of the low-frequency signal is $\Delta\varphi_L=2\pi\cdot\Delta V\cdot(L-L')/V_\pi L$, where a term of $-L'$ has attenuated the phase difference of the low-frequency signal, thus the phase difference of the high-frequency signal $\Delta\varphi_H$ will not be significantly lower than the phase difference of the low frequency signal $\Delta\varphi_L$, that is, having a large bandwidth. Thus, the electro-optic modulator of the present embodiment has expanded the bandwidth and supported a higher communication rate.

Figure 2:
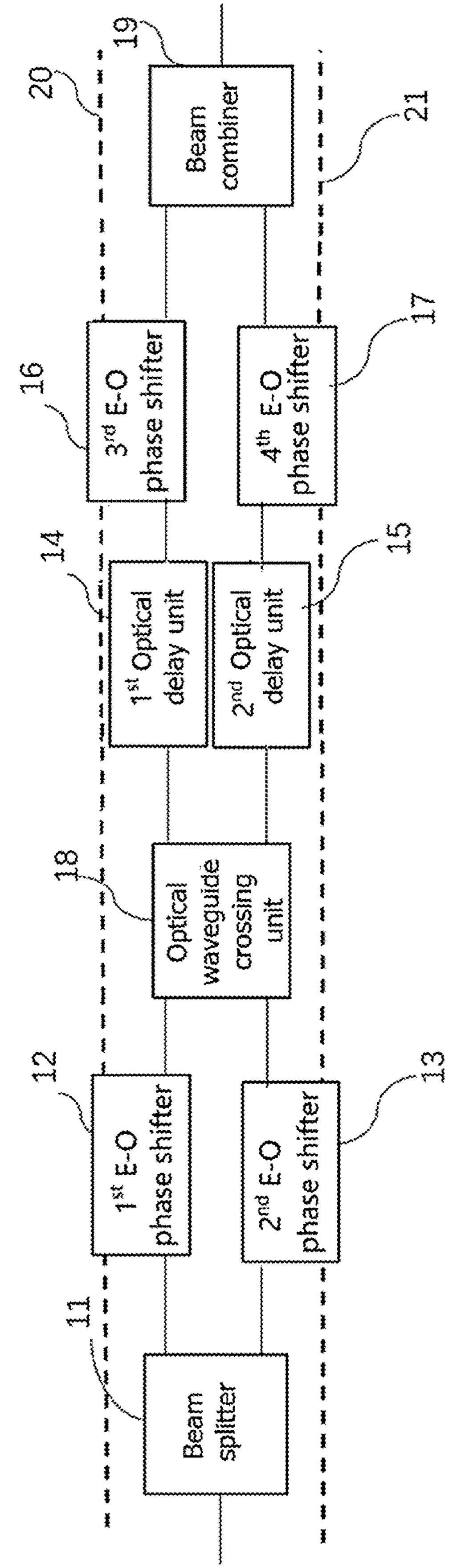
FIG. 2 illustrates a principle block diagram on an electro-optic modulator according to another embodiment of the present application.

Along an optical signal transmission direction, a plurality of positions of the optical delay unit and the optical waveguide crossing unit are not restricted, shown as FIG. 1, both the first optical delay unit 14 and the second optical delay unit 15 are located in front of the optical waveguide crossing unit 18, and shown as FIG. 2, both the first optical delay unit 14 and the second optical delay unit 15 are located behind the optical waveguide crossing unit 18. An optical signal is split into two paths by the beam splitter 11, that is, a first optical signal entering the first adjusting arm and a second optical signal entering the second adjusting arm respectively. The first optical signal is phase-modulated by the first electro-optical phase shifter 12, before being converted in the optical waveguide crossing unit 18 and entering the second adjusting arm, and passing through the second optical delay unit 15 and the fourth electro-optical phase shifter 17, before entering the beam combiner 19. Synchronously, the second optical signal is phase-modulated by the second electro-optical phase shifter 16, before being converted in the optical waveguide crossing unit 18 and entering the first adjusting arm, and passing through the first optical delay unit 14 and the third electro-optical phase shifter 16, before entering the beam combiner 19. Two optical signals after being modulated are combined at the beam combiner 19 before being output.

Figure 3:
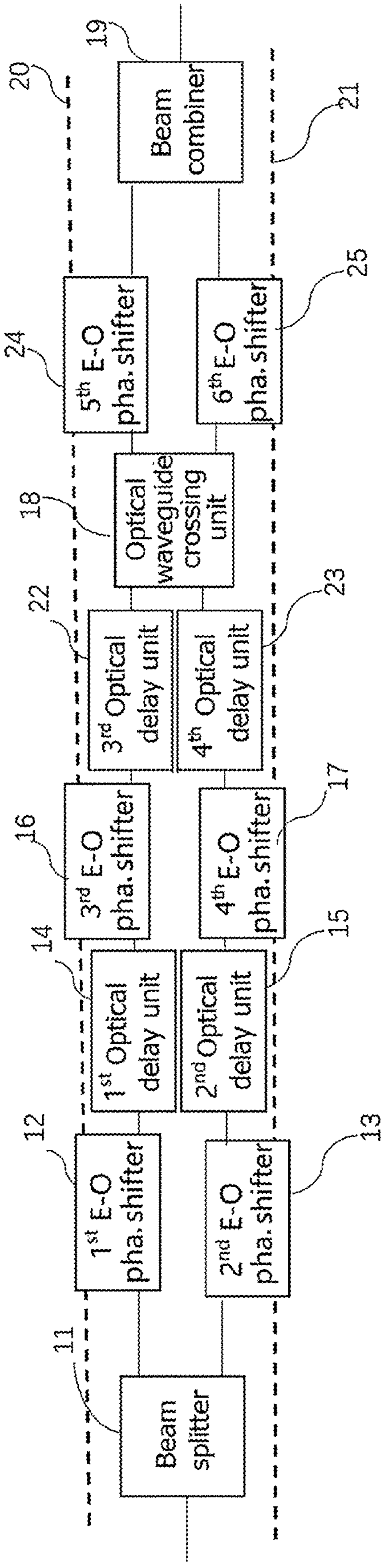
FIG. 3 illustrates a principle block diagram on an electro-optic modulator according to another embodiment of the present application.

In one embodiment, the first adjusting arm and the second adjusting arm, wherein each optical waveguide segment has at least two optical delay units arranged. Shown as FIG. 3, a first optical waveguide segment of the first adjusting arm has a first optical delay unit 14 and a third optical delay unit 22 arranged; a first optical waveguide segment of the second adjusting arm has a second optical delay unit 15 and a fourth optical delay unit 23 arranged. Specifically, an amount of optical delay units arranged on each optical waveguide segment is not limited, while the optical delay units arranged in the optical waveguide segments locating at a same position in different adjusting arms have a same amount and a same position. In an embodiment, along the optical signal transmission direction, the first optical delay unit 14 and the second optical delay unit 15 are both arranged behind the first electro-optical phase shifter 12 and the second electro-optical phase shifter 13, while in front of the third electro-optical phase shifter 16 and the fourth electro-optical phase shifter 17; the third optical delay unit 22 and the fourth optical delay unit 23 are both arranged behind the third electro-optical phase shifter 16 and the fourth electro-optical phase shifter 17, but in front of the second optical waveguide crossing unit **18*b***. That is, the two optical signals are delayed twice in two adjusting arms correspondingly. Increasing the amount of the optical delay units can increase a flexibility of adjusting the frequency response of the modulator, at a same time of expanding the bandwidth, being able to adapt to various application scenarios.

Figure 4:
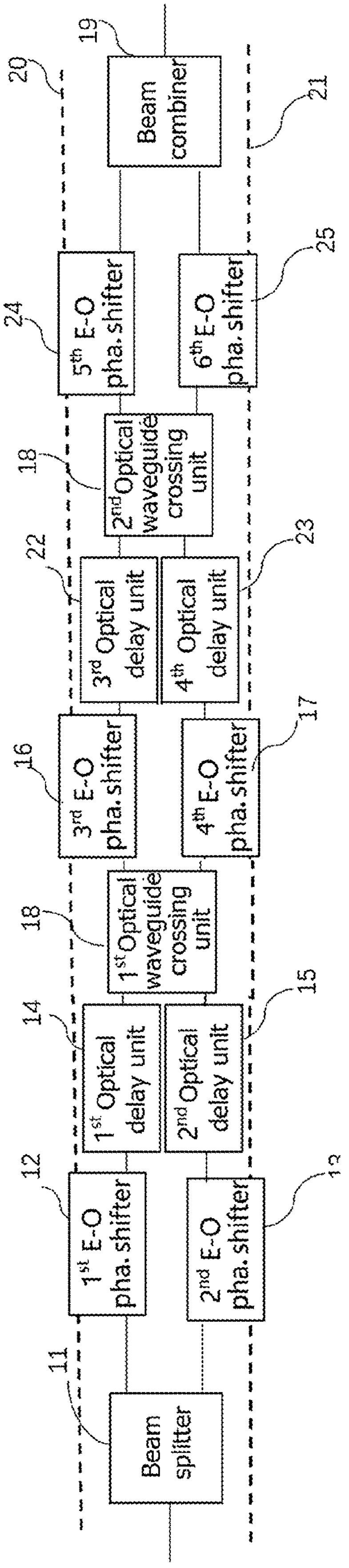
FIG. 4 illustrates a principle block diagram on an electro-optic modulator according to another embodiment of the present application.

Each adjusting arm has an electro-optic phase shifter and an optical delay unit arranged in pairs, and in each pair, the optical delay unit is located behind the electro-optical phase shifter. The electro-optical phase shifter and the optical delay unit are arranged in pairs, it can be understood as, one electro-optical phase shifter and one optical delay unit are arranged on a same optical waveguide segment, or two or more pairs of electro-optical phase shifters and optical delay units are arranged on a same optical waveguide segment, that is, an amount of the electro-optical phase shifters and an amount of the optical delay units are a same. In an embodiment, along the optical signal transmission direction, shown as FIG. 3 and FIG. 4, the first electro-optical phase shifter 12 and the first optical delay unit 14, the third electro-optical phase shifter 16 and the third optical delay unit 22, the second electro-optical phase shifter 13 and the second optical delay unit 15, the fourth electro-optical phase shifter 17 and the fourth optical delay unit 23 are arranged in pairs, while each delay unit is located behind the electro-optical phase shifter correspondingly.

On a same optical waveguide segment, two optical delay units may have a same structure or different structures. The optical delay unit may be an optical delay line, a slow wave structure, or a sub-wavelength grating. Specifically, the first optical delay unit 14 and the third optical delay unit 22 have a same structure, while the second optical delay unit 15 and the fourth optical delay unit 23 have different structures.

Specifically, the optical delay units on different adjusting arms may have a same structure or different structures. Shown as FIG. 1 and FIG. 2, the first optical delay unit 14 and the second optical delay unit 15 may be designed as a same structure, or may be designed as different structures, but having a same delay amount, so as to keep two signals having a consistent transmission rate.

An amount the optical waveguide crossing unit 18 is one, and along the optical signal transmission direction, shown as FIG. 1, all of the optical delay units (that is, the first optical delay unit 14 and the second optical delay unit 15) are located on an optical waveguide segment in front of the optical waveguide crossing unit 18, or shown as FIG. 2, all of the optical delay units (that is, the first optical delay unit 14 and the second optical delay unit 15) are located on an optical waveguide segment behind the optical waveguide crossing unit 18.

In another embodiment, there are a plurality of optical waveguide crossing units 18 arranged, which may be corresponding to an amount of the optical waveguide segments in each adjusting arm, that is, each pair of adjacent optical waveguide segments has one optical waveguide crossing unit 18 arranged in between. Shown as FIG. 4, the first electro-optical phase shifter 12 and the third electro-optical phase shifter 16 have a first optical waveguide crossing unit 18*a* arranged in between, the third electro-optical phase shifter 16 and the fifth electro-optical phase shifter 24 have a second optical waveguide crossing unit 18*b* arranged in between. That is, the first optical waveguide crossing unit 18*a* and the second optical waveguide crossing unit 18*b* are arranged in series between the first electro-optical phase shifter 12 and the fifth electro-optical phase shifter 24. In the present embodiment, the optical signal is converted twice by the first optical waveguide crossing unit 18*a* and the second optical waveguide crossing unit 18*b*, which is able to increase the flexibility of adjusting the frequency response of the modulator while expanding the bandwidth, so as to adapt to various application scenarios. That is, the first optical signal, after passing through the first electro-optical phase shifter 12 and the first optical delay unit 14, enters the first optical waveguide crossing unit 18*a* before being converted into the second adjusting arm, and after passing through the fourth electro-optical phase shifter 17 and the fourth optical delay unit 23, enters the second optical waveguide crossing unit 18*b* before being converted into the first adjusting arm, and passes through the fifth electro-optical phase shifter 24 before reaching the beam combiner 19. The second optical signal, after passing through the second electro-optical phase shifter 13 and the second optical delay unit 15, enters the first optical waveguide crossing unit 18*a* before being converted into the first adjusting arm, and after passing through the third electro-optical phase shifter 16 and the third optical delay unit 22, enters the second optical waveguide crossing unit 18*b* before being converted into the second adjusting arm, and passes through the sixth electro-optical phase shifter 26 before reaching the beam combiner 19. The first optical signal and the second optical signal are combined at the beam combiner 19 before being output. In the present embodiment, each adjusting arm is divided into three segments, and a first optical waveguide segment has a delay unit arranged on, so as to achieve modulating the optical signal, being able to adjust the optical signal more sensitively, thereby achieving high-bandwidth high-speed modulation and transmission. An amount of the optical waveguide crossing units 18 may be greater than two, in an embodiment, the optical waveguide segment at a same position of the two adjusting arms may both have a plurality of optical waveguide crossing units arranged on, which is not limited herein; and an amount of the optical delay units may also be arranged more than one, in an embodiment, each optical waveguide segment has more than one of the optical delay units arranged, which is not limited herein, and may be arranged according to a sensitivity requirement of an optical signal transmission.

The beam splitter 11 and the beam combiner 19 are one of a directional coupler, a multimode interferometer, and a Y-shaped coupler respectively. A structure of the beam splitter 11 and a structure of the beam combiner 19 may be same or different, which is not limited herein.

In an embodiment, the electro-optic modulator is integrated on a silicon-on-insulator material platform, a thin-film lithium niobate material platform, a groups III-V material platform, a barium titanate material platform, a thin film lithium tantalate material platform, a lead zirconate titanate material platform, or a plurality of existing platforms with other materials, which is not limited herein.

According to a second aspect of an embodiment of the present application, a light emitting device is provided, comprising: a housing, a driving circuit, and the electro-optic modulator according to any one of the embodiments stated hereinabove. The electro-optic modulator and the driving circuit are arranged inside the housing, while both the first electrode line and the second electrode line are connected to the driving circuit. In the present embodiment, the driving circuit may be a radio frequency device. The optical transmitting device in the present embodiment is able to achieve an optical signal transmission with a large-bandwidth.

The description of the embodiments stated hereinabove is intended to facilitate understanding and applying the present application by those skilled in the art. Those familiar with the technology can obviously make various modifications to these embodiments and apply the general principles described herein to other embodiments without having to engage in creative labor. Therefore, the present application is not limited to the embodiments described here. Improvements and modifications made by those skilled in the art based on the content disclosed in the present application, without departing from the scope and spirit of the present application, are all within the scope of the present application.

What is claimed is:

1. An electro-optic modulator, comprising:

an optical waveguide structure including a beam splitter, a first adjusting arm, a second adjusting arm, an optical waveguide crossing unit, an optical delay unit, and a beam combiner, wherein each of the first adjusting arm and the second adjusting arm includes at least two optical waveguide segments along an optical signal transmission direction, each of the optical waveguide segments has an electro-optical phase shifter arranged; at least one optical waveguide segment of the first adjusting arm has an optical delay unit arranged, and at least one optical waveguide segment of the second adjusting arm has an optical delay unit arranged, having an amount of the optical delay units and a position thereof on each adjusting arm being same along the optical signal transmission direction; the first adjusting arm and the second adjusting arm are arranged in parallel, while both ends of each adjusting arm are connected to the beam splitter and the beam combiner respectively; the optical waveguide crossing unit is arranged between adjacent optical waveguide segments of the first adjusting arm and the second adjusting arm, such that a first optical signal in the first adjusting arm and a second optical signal in the second adjusting arm are exchanged at the optical waveguide crossing unit;

an electrode structure including a first electrode line and a second electrode line arranged in parallel, wherein the optical waveguide structure is arranged between the first electrode line and the second electrode line, each electro-optical phase shifter on the first adjusting arm is electrically connected to the first electrode line, and each electro-optical phase shifter on the second adjusting arm is electrically connected to the second electrode line.

2. The electro-optic modulator according to claim 1, wherein the first adjusting arm and the second adjusting arm have one of the optical waveguide segments being arranged with at least two optical delay units.

3. The electro-optic modulator according to claim 2, wherein two of the optical delay units on a same optical waveguide segment have two different structures.

4. The electro-optic modulator according to claim 1, wherein the optical delay unit is an optical delay line, a slow wave structure, or a sub-wavelength grating.

5. The electro-optic modulator according to claim 1, wherein each of the adjusting arms has the electro-optic phase shifter and the optical delay unit arranged in pairs, and in each pair, the optical delay unit is located behind the electro-optic phase shifter.

6. The electro-optic modulator according to claim 1, wherein the optical waveguide crossing unit includes a first optical waveguide crossing unit and a second optical waveguide crossing unit connected in series, and the first optical waveguide crossing unit and the second optical waveguide crossing unit are located between adjacent optical waveguide segments.

7. The electro-optic modulator according to claim 6, wherein a light path connecting the first optical waveguide crossing unit in series and a parallel light path connecting the second optical waveguide crossing unit in series both have the optical delay unit arranged.

8. The electro-optic modulator according to claim 1, wherein each of the beam splitter and the beam combiner is one of a directional coupler, a multimode interferometer, and a Y-coupler, respectively.

9. The electro-optic modulator according to claim 1, wherein the electro-optic modulator is integrated on a silicon-on-insulator material platform, a thin-film lithium niobate material platform, a groups III-V material platform, a barium titanate material platform, a thin film lithium tantalate material platform, or a lead zirconate titanate material platform.

10. A light emitting device, comprising: a housing, a driving circuit, and the electro-optic modulator according to claim 1; wherein the electro-optic modulator and the driving circuit are arranged inside the housing, and both the first electrode line and the second electrode line are connected to the driving circuit.

* * * * *